United States Patent [19]

Schmidt et al.

[11] Patent Number: 4,890,454
[45] Date of Patent: Jan. 2, 1990

[54] WALL SURFACE STRUCTURE HAVING AN IMPROVED RADIANT HEAT DISCHARGE CAPABILITY

[75] Inventors: Guenther Schmidt, Taufkirchen; Peter Schmid, Munich, both of Fed. Rep. of Germany

[73] Assignee: Messerschmitt-Boelkow-Blohm GmbH, Munich, Fed. Rep. of Germany

[21] Appl. No.: 331,276

[22] Filed: Mar. 30, 1989

[30] Foreign Application Priority Data

Apr. 7, 1988 [DE] Fed. Rep. of Germany ....... 3811613

[51] Int. Cl.[4] .......................... F02K 9/64; F28F 13/18; B64G 1/26; H01L 23/36
[52] U.S. Cl. ......................................... 60/266; 60/257; 165/47; 165/133; 165/169; 165/904
[58] Field of Search ................... 60/257, 266; 165/47, 165/169, 133, 904

[56] References Cited

U.S. PATENT DOCUMENTS

| Re. 30,077 | 8/1979 | Kun et al. | 165/133 |
| 2,914,915 | 12/1959 | Sziklas et al. | 165/904 |
| 3,154,914 | 11/1964 | Stockel | 165/169 |
| 3,285,333 | 11/1966 | Johnson, Jr. | 165/904 |
| 3,301,319 | 1/1967 | Merrill | 165/133 |
| 3,595,025 | 7/1971 | Stockel | 165/169 |
| 3,648,461 | 3/1972 | Bailey et al. | 60/266 |
| 3,753,364 | 8/1973 | Runyan et al. | 165/133 |
| 3,798,902 | 3/1974 | Butter | 165/169 |
| 3,930,627 | 1/1976 | Miller | 60/39.5 |
| 4,166,498 | 9/1979 | Fujie et al. | 165/133 |
| 4,819,719 | 4/1989 | Grote et al. | 165/133 |

FOREIGN PATENT DOCUMENTS 3446243 6/1986 Fed. Rep. of Germany.

Primary Examiner—John Ford
Attorney, Agent, or Firm—W. G. Fasse; D. H. Kane, Jr.

[57] ABSTRACT

The wall of a structural component that is subject to high thermal and mechanical stress, such as a position control rocket drive, has a plurality of grooves in its surface for an improved heat discharge by radiation emission. The grooves are cut into the wall surface and have a substantially U-type cross-sectional shape with parallel sidewalls and a substantially rounded groove bottom. The heat emission efficiency is substantially improved by making the groove depth (t) to be about 100 μm and the groove width (b) to be at least 20% of the groove depth, thus (t/b) is at least 5. Additionally, the maximally permissable groove shape tolerance over the entire groove length must be ±1 μm and the smallest spacing between neighboring grooves is about 10 μm.

7 Claims, 1 Drawing Sheet

WALL SURFACE STRUCTURE HAVING AN IMPROVED RADIANT HEAT DISCHARGE CAPABILITY

FIELD OF THE INVENTION

The invention relates to a surface wall structure having a surface with an improved heat discharge capability by radiating heat, for example from a surface of a wall subject to high thermal and mechanical stress, for example in a position control rocket drive having an integral combustion chamber and nozzle structure.

BACKGROUND INFORMATION

Such structures are required to operate in precision structural components by giving off heat through radiation. These structures operate primarily in a pure gaseous environment or in a vacuum.

In connection with rocket propulsion systems for operation in outer space, for example in connection with position control drive means, radiation cooling is the preferred type of cooling. Compared to the regenerative cooling, the radiation cooling has several advantages. For example, radiation cooling does not require any complicated hollow wall structures with cooling channels. Further, radiation cooling does not involve any power losses, for example, due to driving of cooling medium pumps. Such pumps and power consumption are necessary for the regenerative cooling. Further, due to material strength considerations, it is necessary to keep the temperature of the propulsion system walls definitely below the melting temperature of these walls. Thus, high propulsion power outputs combined with high heat flow densities are possible only by using corrosion resistant materials having a high melting point. Such materials, for example platinum, however have a very low emission coefficient, or rather heat emission coefficient so that the advantage of the higher permissible wall temperature is again lost totally, or at least partially.

The application of layers or coatings having a better radiation emission characteristic is generally defeated due to the lack of a sufficient bonding strength and temperature resistance of such layers relative to the wall structure.

German Patent Publication (DE-OS) No. 3,446,243 discloses a microstructure for improving the heat removal by radiation or even heat absorption of a structural component surface. The known microstructure comprises straight ribs alternating with grooves having a rectangular groove bottom. The ribs themselves have a rounded facing outer edge. The grooves are filled with a material that is permeable to infrared radiation for increasing the mechanical strength of such wall structures and to also improve the corrosion resistance thereof. Glass or synthetic material is suitable for this filling purpose. The prior art does not make any statements with regard to the precise dimensions of the ribs and/or grooves, nor is there any mention regarding the production of such grooves. Generally, however, it is known that a rectangular groove bottom results in notching stresses, whereby the structural component is mechanically weakened. Further, the combination of the grooves with a filler material does not permit high structural component temperatures. This is so on the one hand due to a limited temperature stability of the filling material such as synthetic material and, on the other hand, it is due to a limited or insufficient bonding strength between the filler material and the groove walls. It is believed that the limited bonding strength is caused by the different heat expansion due to different heat expansion coefficients of the wall material and the filler material.

U.S. Re. Pat. No.: 30,077 describes microstructure surfaces for improving the bubble formation in nucleate boiling of liquids. The bubble formation is improved by providing the interface surface between the solid and the liquid with narrow deep grooves. The ribs remaining between these grooves are locally deformed in their ridge zone so that the groove width becomes smaller toward the exit end of the groove. The largest groove density corresponds to nine grooves per millimeter. The minimal groove depth corresponds to 203 $\mu$m. The smallest groove width in the exit zone is 13 $\mu$m. These conventional grooves for the purpose of nucleate boiling are cut by conventional tools, for example, by milling or shaping on a shaping machine or by deformation without cutting, for example by a rolling operation. The enlarged scale micrographs of polished sections as, for example shown in FIGS. 2, 3, and 5, illustrate the very large variations in the groove shape, position, and dimensions so that definite statements of any kind must be considered to be merely rough mean values. Hence, the production method disclosed in U.S. Pat. No. Re. 30,007 is not usable for applications where the surface structure and thus, for example, the radiation characteristic of the surface structure must corresponds precisely to previously made theoretical requirements.

A further known method for producing microstructure surface configurations is the chemical etching. However, chemical etching results in a surface configuration which is rather fissured or ragged in the zones exposed to the chemical etching. Thus, substantial notching stresses are introduced into the surface treated by chemical etching. As a result, this method is not suitable for modifying the surface configuration of structural components which have thin walls and are subject to high mechanical and thermal stresses.

OBJECTS OF THE INVENTION

In view of the above it is the aim of the invention to achieve the following objects singly or in combination:

to provide a microsurface structure for use on thin-walled structural components intended, for example, to operate in a substantially clean gaseous environment or in a vacuum for obtaining a sufficient heat removal from such wall structures which are subject to high thermal and mechanical stresses;

to construct such a surface configuration which is suitable even for high precision structural components;

to provide a microsurface configuration suitable for an efficient heat removal by radiation;

to assure a highly efficient radiation heat removal while simultaneously avoiding any noticeable, negative influences on the mechanical and thermal characteristics of such thin-walled structures, especially to avoid notching stresses;

to provide a surface configuration which has exactly defined radiation characteristics in the desired locations, whereby these characteristics must be produceable with high precision to obtain "black box" radiation characteristics; and to provide a method for producing these surface structures with the desired characteristics.

SUMMARY OF THE INVENTION

A surface configuration having an improved heat discharge characteristic due to an improved heat radiation is characterized according to the invention by grooves having a U-type cross-sectional configuration with parallel side walls and a substantially rounded groove bottom. Further, the groove depth (t) is about 100 μm. The ratio of the groove depth (t) to the groove width (b) is at least five. Further, the maximally permissible shape tolerance along a total groove length is ±1 μm. The surface structure further comprises ribs between neighboring grooves, whereby the ribs have a minimal rib width (a) of about 10 μm.

Grooves according to the invention are preferably produced in a cutting operation by means of a profiled diamond tool. The cutting operation is preferably performed by a plunge type cutting on a lathe.

Surface configurations according to the invention are particularly suitable for the thin walls of position control rocket drives having an integral combustion chamber and nozzle structure. Such rocket drives have a restriction or neck between a nozzle injection head and a nozzle exit. The axial spacing between neighboring groove cross-sections should be smallest in the range of this nozzle neck while the axial spacing should increase away from the nozzle neck toward the injection head and/or toward the nozzle exit.

The invention has succeeded to provide surfaces requiring cooling with a surface radiation characteristic approximating that of a "black body". This advantage has been achieved by the above defined shape and by the above defined dimensions of the grooves and the axial spacing between grooves, also referred to as the groove density. Further, the grooves constructed as taught herein do not noticeably reduce the mechanical strength of the respective wall structures. The required precision can be accomplished by cutting the grooves with a respectively profiled diamond tool on a lathe, for example.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
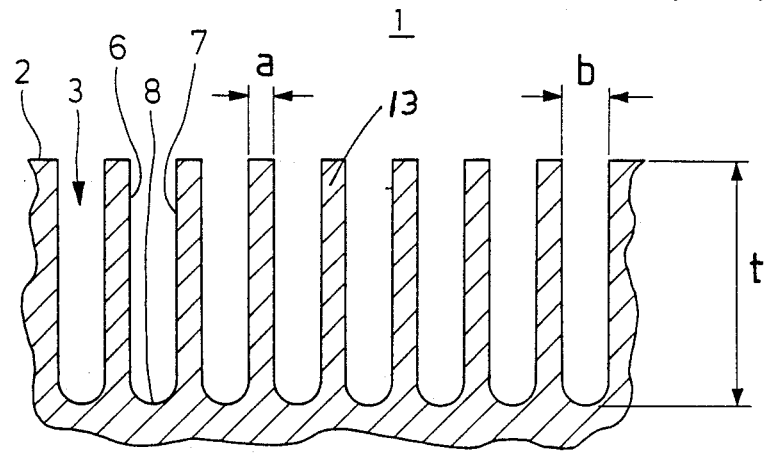
FIG. 1 shows, on an enlarged scale, a sectional view through a groove and rib construction according to the invention.

FIG. 1 shows a surface construction 1 which has been produced by first polishing the structural component surface 2 to make it smooth and highly precise. Grooves 3 are then cut by material removal into the so-prepared surface 2. Each groove 3 has a substantially U-type cross-sectional configuration with two side walls 6 and 7 extending in parallel to each other. Further, each groove has a rounded groove bottom 8 which avoids notching stresses. Other groove bottom cross-sectional configurations are possible. Thus, rather than using a single radius forming a rounded groove bottom 8, other contours may be considered, for example a parabolic contour or a contour having two radii in the corners with an intermediate straight section. The shape of the groove bottom 8 has two purposes. First, it is important that the above mentioned notch stresses are avoided. Second, it is advantageous to use a groove bottom which can be machined by a relatively simple tool configuration and with tools having a substantial useful life.

The grooves have a groove depth (t) and a groove width (b), whereby the ratio (t/b) should be at least five. In other words, the groove width (b) should be at least 20% of the groove depth (t) so that for a respectively high groove density involving a groove spacing that is as small as possible, an emission characteristic is achieved which corresponds approximately to that of a black body. The groove spacing corresponds to the width (a) of the ribs 13 between neighboring grooves 3.

With regard to the optical cavern effect of the grooves 3, it would be useful to widen the groove cross-section in the groove bottom 8. However, the production of widened groove bottoms, for example, by means of back-cuts which make the groove bottom wider than the rest of the groove width, it would be necessary to axially displace the tool which would lead to a tool configuration that has undesirable strength characteristics. Thus, forming the grooves with parallel side walls 6 and 7 is preferred.

A widening of the groove cross-section toward the component surface 2 is not practical because such a configuration even makes the optical cavern effect worse.

The wall thickness of a position control rocket drive is typically about 1 mm. For such a wall structure the groove depth (t) would be about 100 μm, whereby no noticeable mechanical weakening of the structural wall occurs. With due regard for all possible handling of such structures, a certain minimal stability of the surface structure 1 must be assured having also regard to loads and tolerances that occur during the manufacture. Therefore, the smallest spacing (a) between neighboring groove cross-sections, that is the rib thickness (a) of the ribs 13, shall not be smaller than about 10 μm.

Tools suitable for cutting the grooves according to the invention include so-called form diamonds. Such diamonds are ground and polished so that they have the desired shape. However, any other high precision preparation of these diamonds may also be suitable for making the required tools. Preferably, these tools are moved only in the longitudinal direction of the grooves and in the direction of the groove depth (t). The latter tool displacement involving a respective feed advance to achieve the above mentioned groove depth of about 100 μm. Lateral tool movements across the longitudinal direction of the grooves are possible. However, such lateral movements reduce normally the manufacturing precision. Hence such lateral tool movements should be avoided. The conventional manufacturing operations of turning on a lathe, planing, shaping on a shaping machine, and broaching are suitable for the present purposes provided the proper tools are used.

The form precision or shape precision of the groove cross-sections that can be achieved with modern machine tools are extremely high over the groove length so that any maximum shape deviation or shape tolerance should be maintained at ±1 μm. In this manner it is practically possible to reproduce theoretically desirable radiation values.

Due to the fine microstructure of the surface configurations according to the invention, it may not be desirable to use such structures in a moist or otherwise contaminated environment such as the atmosphere on earth. However, the present invention may well be used on earth in so-called clean rooms or in an artificially treated atmosphere of a suitable gas. Primarily the preferred application of the present invention will be in the vacuum of outer space.

Figure 2:
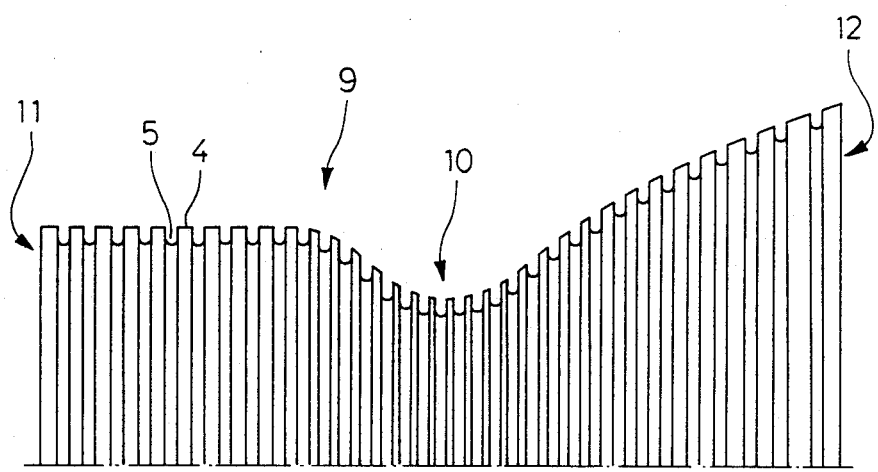
FIG. 2 shows the upper half of a position control rocket drive having a surface construction according to the invention.

FIG. 2 shows a simplified illustration of a practical application of the present invention in the wall construction of a position control rocket drive 9, only the upper half of which is shown. Such position control rocket drives 9 are used, for example, on satellites or the like. For optical reasons and reasons of practical illustration, the grooves 5 are shown on a substantially enlarged scale relative to the shown size of the rocket drive, whereby the depth to width ratio is not to scale. In actuality such a rocket drive may ahve a length of, for example 100 mm. On such a length about 3000 grooves 5 will be cut. The drive 9 comprises as an integral component of the entire drive a combustion chamber and a nozzle structure, whereby the left-hand end 11 forms a so-called injection head, while the right-hand end forms the nozzle exit 12. The nozzle neck 10 is located intermediate the ends 11 and 12. The grooves are formed by a high precision cutting operation on a lathe. More specifically, the grooves 5 can be formed by so-called plunge cutting on a lathe into the wall surface 4, whereby the feed advance takes place perpendicularly to the longitudinal axis of the drive 9, said axis being shown by a dash-dotted line in FIG. 2. In surface zones that converge, for example, to the left of the deepest neck portion in FIG. 2, and in zones that diverge, for example, to the right of the deepest neck portion in FIG. 2, the ratio of the groove depth (t) to the groove width (b) also satisfies the requirement that it should be at least 5. The groove width (b) is the same over the entire length of the drive 9 and corresponds to the width of the plunge cutting tool, for example in the shape of a form diamond. However, the rib width (a) varies along the length of the drive 9 for adapting the heat radiation characteristics to the varying locally differing heat loads. Thus, the groove density is largest in the area of the nozzle neck 10 and it diminishes toward the injection head 11 as well as toward the nozzle exit 12. In other words, the spacing or rib width (a) increases toward the ends 11 and 12.

It is also an advantage of the invention that due to the improved radiation cooling it is now possible that for given drive dimensions the drive output power may be increased and/or the operational life of such drives may be increased. If the output power and the required operational life can stay the same as heretofore, it is possible according to the invention to make the respective control drives smaller and lighter Although the invention has been described with reference to specific example embodiments, it will be appreciated that it is intended to cover all modifications and equivalents within the scope of the appended claims.

What we claim is:

1. A surface structure for a wall of a structural component subject to high thermal and mechanical stress, comprising a plurality of substantially parallel closely spaced grooves having a substantially U-type cross-sectional shape with parallel side walls and with a substantially rounded groove bottom for avoiding a notching effect, said grooves having a groove depth (t) of about 100 $\mu$m and such a groove width (b) that the ratio (t/b) is at least five, each groove having a given total groove length, each groove having a maximally permissible shape tolerance of $\pm 1$ $\mu$m along said total groove length, said surface structure further comprising ribs between neighboring grooves, said ribs having a minimal rib width (a) of about 10 $\mu$m, whereby an improved heat discharge by radiation emission is achieved.

2. The surface structure of claim 1, wherein said structural component has a shape of rotational symmetry, and wherein said grooves extend in said wall in a circumferential direction around said shape of rotational symmetry.

3. The surface structure of claim 2, wherein said structural component is a position control rocket drive including a combustion chamber formed by said wall with an injection head, a nozzle exit end, and a nozzle throat between said injection head and said nozzle exit end, and wherein said rib width (a) in an axial direction of said combustion chamber is smallest along said nozzle throat, said rib width (a) increasing from said nozzle throat toward at least one of said injection head end and said nozzle exit end.

4. The surface structure of claim 1, wherein said grooves are cut by a profiled diamond.

5. The surface structure of claim 1, wherein said grooves are cut by a plunge cutting operation on a lathe.

6. The surface structure of claim 3, wherein said groove width (b) is constant along the length of said structural component.

7. The surface structure of claim 1, wherein said rib width (a) is within the range of about at least 10 $\mu$m to about 100 $\mu$m.

* * * * *